United States Patent
Yang et al.

(10) Patent No.: US 9,936,522 B2
(45) Date of Patent: Apr. 3, 2018

(54) METHOD, DEVICE AND COMPUTER READABLE STORAGE MEDIUM FOR PROCESSING CHANNEL ACCESS

(71) Applicant: ZTE Corporation, Shenzhen, Guangdong (CN)

(72) Inventors: Dan Yang, Shenzhen (CN); Weimin Xing, Shenzhen (CN); Kaiying Lv, Shenzhen (CN); Bo Sun, Shenzhen (CN); Nan Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 158 days.

(21) Appl. No.: 14/786,681

(22) PCT Filed: Dec. 30, 2013

(86) PCT No.: PCT/CN2013/090890
§ 371 (c)(1),
(2) Date: Oct. 23, 2015

(87) PCT Pub. No.: WO2014/173164
PCT Pub. Date: Oct. 30, 2014

(65) Prior Publication Data
US 2016/0081119 A1    Mar. 17, 2016

(30) Foreign Application Priority Data
Apr. 24, 2013 (CN) .......................... 2013 1 0145483

(51) Int. Cl.
*H04W 74/08*    (2009.01)
*H04W 24/08*    (2009.01)
*H04W 84/12*    (2009.01)

(52) U.S. Cl.
CPC ....... *H04W 74/0816* (2013.01); *H04W 24/08* (2013.01); *H04W 84/12* (2013.01)

(58) Field of Classification Search
CPC .. H04W 74/0816; H04W 24/08; H04W 84/12
See application file for complete search history.

(56) References Cited

U.S. PATENT DOCUMENTS 7,523,205 B1 * 4/2009 Sherman ........... H04W 74/0808
370/462
2005/0210157 A1 * 9/2005 Sakoda ............. H04W 74/0816
709/251

(Continued)

FOREIGN PATENT DOCUMENTS

CN      1599341 A      3/2005
CN    101223731 A      7/2008

(Continued)

OTHER PUBLICATIONS

Supplementary European Search Report in European application No. 13883261.3, dated Mar. 7, 2016.

(Continued)

*Primary Examiner* — Hashim Bhatti
(74) *Attorney, Agent, or Firm* — Oppedahl Patent Law Firm LLC

(57) ABSTRACT

A method for processing channel access is disclosed in the present invention, which includes: a wireless station determines a first delay access variable and/or a second delay access variable according to the received wireless frame; the wireless station determines delay time for accessing a channel according to the second delay access variable or according to the first delay access variable and the second delay access variable. A device for processing channel access is also disclosed in the present invention.

12 Claims, 6 Drawing Sheets

(56) References Cited

U.S. PATENT DOCUMENTS

| | | | |
|---|---|---|---|
| 2007/0110091 A1 | 5/2007 | Kwon | |
| 2007/0171933 A1* | 7/2007 | Sammour | H04W 74/0816 370/447 |
| 2009/0279524 A1* | 11/2009 | Yu | H04W 74/0833 370/338 |
| 2010/0074198 A1* | 3/2010 | Morioka | H04L 12/413 370/329 |
| 2011/0310860 A1* | 12/2011 | Denteneer | H04W 74/04 370/336 |
| 2012/0106352 A1* | 5/2012 | Peruzzi | H04W 74/08 370/241 |
| 2013/0051256 A1* | 2/2013 | Ong | H04W 72/042 370/252 |

FOREIGN PATENT DOCUMENTS

| | | |
|---|---|---|
| CN | 101582818 A | 11/2009 |
| CN | 102026297 A | 4/2011 |
| CN | 102547785 A | 7/2012 |
| CN | 102695286 A | 9/2012 |
| CN | 102883460 A | 1/2013 |
| CN | 103228056 A | 7/2013 |
| WO | 2007087216 A2 | 8/2007 |
| WO | 2010103415 A1 | 9/2010 |
| WO | 2010131060 A1 | 11/2010 |

OTHER PUBLICATIONS

International Search Report in international application No. PCT/CN2013/090890, dated Apr. 3, 2014.
English Translation of the Written Opinion of the International Search Authority in international application No. PCT/CN2013/090890, dated Apr. 3, 2014.

* cited by examiner

METHOD, DEVICE AND COMPUTER READABLE STORAGE MEDIUM FOR PROCESSING CHANNEL ACCESS

TECHNICAL FIELD

The disclosure relates to overhearing station access channel technology in the field of wireless communications, and in particularly, to a method, device and computer readable storage medium for processing channel access.

BACKGROUND

In a present Wireless Local Area Networks (WLAN), an Access Point (AP) and a plurality of stations (STA) associated with the AP may constitute a Basic Service Set (BSS). A central AP and stations in a network may use a Carrier Sense Multiple Access/Collision Avoidance (CSMA/CA) mechanism to share channels. In this mechanism, there is an issue of collision due to hidden stations. For example, as shown in FIG. 1, station A is located in coverage of BSS 1, station B is located in coverage of BSS 2, and station D is located in coverage of BSS 3. Since the coverage of BSS 1 and BSS 2 does not overlap with each other, station A and station B cannot sense each other. However, station A and station B both can communicate with another station C. Therefore, when station A and station B both communicate with station C simultaneously, collision will occurs based on the CSMA/CA mechanism.

In order to solve the issue of collision due to hidden stations, the Institute of Electrical and Electronic Engineers (IEEE) presents a virtual channel detection mechanism. In this mechanism, by including subscription channel duration information in header of a radio frame, an overhearing station that receives a radio frame including the subscription channel duration information may set a locally stored network allocation vector (NAV), value of which may be set to the maximum value of the subscription channel duration information. During this duration, the overhearing station does not transmit data, thus avoiding contention channel by the hidden stations. After the NAV being reduced to zero, the overhearing station can content channel for transmitting data. As shown in FIG. 2, a schematic diagram of delay access to a channel by an overhearing station according to settings of NAV is illustrated. In FIG. 2, RTS refers to a Request To Send frame, and CTS refers to a Clear To Send frame.

However, in some situations, the overhearing station does not acquire the duration information. Then, the overhearing station must wait for at least an Extended Interframe Space (EIFS) after receiving a radio frame to access channel when a receiving station returns an acknowledgment (ACK) by default in the EIFS. In practice, the receiving station may return an ACK, a BlockACK, data, or no response. In this case, EIFS is not accurate enough. With respect to this case, IEEE defines early ACK indication in which 2 bits in signaling field of physical frame header are used as ACK indication. Different settings of ACK indication are used to indicate the following 4 cases:

1) no response;
2) ACK;
3) BlockACK;
4) non-ACK, non-BlockACK or non-CTS frame.

Correspondingly, IEEE presents a channel virtual carrier detection mechanism, i.e., Response Indication Deferral (RID). In this mechanism, an RID timer is defined according to the ACK indication field in which different duration of the RID timer is defined according to different settings of the ACK indication. In addition, the value of the RID timer may be reset upon receiving a new PHY-RXSTART.indication.

The settings of RID timer are different with that of NAV in that: the value of NAV is updated with the greater value of the newly acquired duration value and the current value of NAV; the value of the RID timer is updated by replacing the old value with a new value, as shown in FIG. 3. FIG. 3 is a schematic diagram of delay access to a channel by an overhearing station according to settings of RID timer. Additionally, the value of RID timer will be reset as long as appearance of a new RXSTART. Since the value of RID timer is obtained through a rough estimate, the accuracy thereof is less than NAV settings. However, the setting of value of RID timer is simply implemented by parsing the physical frame header which is advantageous for energy-saving.

In the related art, when a station receives a radio frame containing ACK indication and duration both, the station may update the value of NAV according to the value of duration in the radio frame, and set the value of RID timer according to the ACK indication contained in the radio frame. In accordance with the meaning of virtual carrier detection, as long as one of the NAV and the RID timer is not 0, then it is considered that the channel is busy. When the roughly estimated value of RID timer is greater than the accurately estimated value of NAV, the overhearing station will access to channel according to the value of RID timer rather than the accurate value of channel subscription duration NAV, which is not advantageous for fast accessing to channel by the overhearing station. As shown in FIG. 4, a schematic diagram of delay access to a channel by an overhearing station according to settings of NAV and RID timer is illustrated.

SUMMARY

In order to solve the technical problems in the related art, embodiments of the disclosure provide a method, device and computer readable storage medium for processing channel access.

An embodiment of the disclosure provides a method for processing channel access. The method includes that:

a wireless station determines a first delay access variable and/or a second delay access variable according to received radio frames;

the wireless station determines delay time for accessing a channel according to the second delay access variable or according to the first delay access variable and the second delay access variable.

Preferably, the method may further include that:

the wireless station may acquire first subscription indication information from the received radio frames, and determine the first delay access variable according to the first subscription indication information.

Preferably, the method may further include that:

the wireless station may acquire second subscription indication information from the received radio frames, and determine the second delay access variable according to the second subscription indication information.

Preferably, the method may further include that:

when the wireless station acquires first subscription indication information and second subscription indication information from the received radio frames, and when a target station of the radio frames is not the wireless station, the wireless station may compare the second subscription indication information with the second delay access variable currently stored in the wireless station, select a greater value among them to update the second delay access variable, and the wireless station may ignore a value of the first delay access variable or setting the first delay access variable to zero or setting the first delay access variable to a same value as the updated second delay access variable; the wireless station may determine the delay time for accessing the channel according to the updated second delay access variable.

Preferably, the method may further include that:

when the wireless station acquires only first subscription indication information from the received radio frames, and when a target station of the radio frames is not the wireless station, the wireless station may set the first delay access variable according to the first subscription indication information, keep a value of the second delay access variable stored in the wireless station constant; the wireless station may determine the delay time for accessing the channel according to a greater value among the first delay access variable and the second delay access variable.

Preferably, the method may further include that:

when the wireless station receives radio frames that are targeted to the wireless station, the wireless station may set the first delay access variable stored in the wireless station itself to zero, and keep the second delay access variable constant.

An embodiment of the disclosure provides a device for processing channel access. The device includes:

a delay access variable determining unit, which is configured to determine a first delay access variable and/or a second delay access variable according to radio frames received by a wireless station;

a delay time determining unit, which is configured to determine delay time for accessing a channel according to the second delay access variable or according to the first delay access variable and the second delay access variable.

The delay access variable determining unit may be further configured, when the wireless station acquires first subscription indication information from the received radio frames, to determine the first delay access variable according to the first subscription indication information.

The delay access variable determining unit may be further configured, when the wireless station acquires second subscription indication information from the received radio frames, to determine the second delay access variable according to the second subscription indication information.

The delay access variable determining unit may be further configured, when the wireless station acquires first subscription indication information and second subscription indication information from the received radio frames, and when a target station of the radio frames is not the wireless station, to compare the second subscription indication information with the second delay access variable currently stored in the wireless station, to select a greater value among them to update the second delay access variable, and to ignore a value of the first delay access variable or set the first delay access variable to zero or set the first delay access variable to a same value as the updated second delay access variable; correspondingly, the delay time determining unit may be further configured to determine the delay time for accessing the channel according to the updated second delay access variable.

The delay access variable determining unit may be further configured, when the wireless station acquires only first subscription indication information from the received radio frames, and when a target station of the radio frames is not the wireless station, to set the first delay access variable according to the first subscription indication information, and to keep a value of the second delay access variable stored in the wireless station constant;

correspondingly, the delay time determining unit may be further configured to determine the delay time for accessing the channel according to a greater value among the first delay access variable and the second delay access variable.

The delay access variable determining unit may be further configured, when the wireless station receives radio frames that are targeted to the wireless station, to set the first delay access variable stored in itself to zero, and to keep the second delay access variable constant.

An embodiment of the disclosure further provides a computer-readable storage medium including a set of instructions for executing the method for processing channel access described in the embodiments of the disclosure.

In the method, device and computer readable storage medium for processing channel access provided in the disclosure, a wireless station determines a first delay access variable and/or a second delay access variable according to the received radio frame; the wireless station determines delay time for accessing a channel according to the second delay access variable or according to the first delay access variable and the second delay access variable. The embodiments of the present invention are advantageous for fast accessing the channel by overhearing stations.

DETAILED DESCRIPTION

Figure 1:
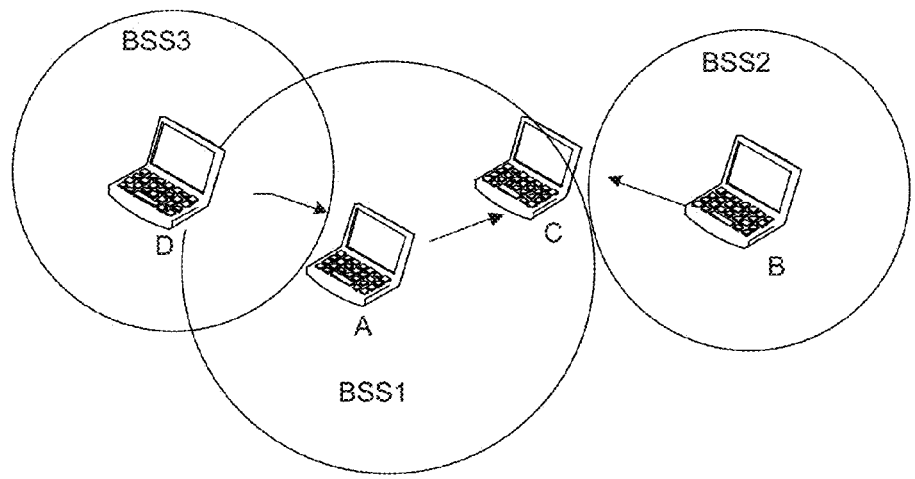
FIG. 1 is a schematic diagram of a collision issue due to hidden stations in the related art.
Figure 2:
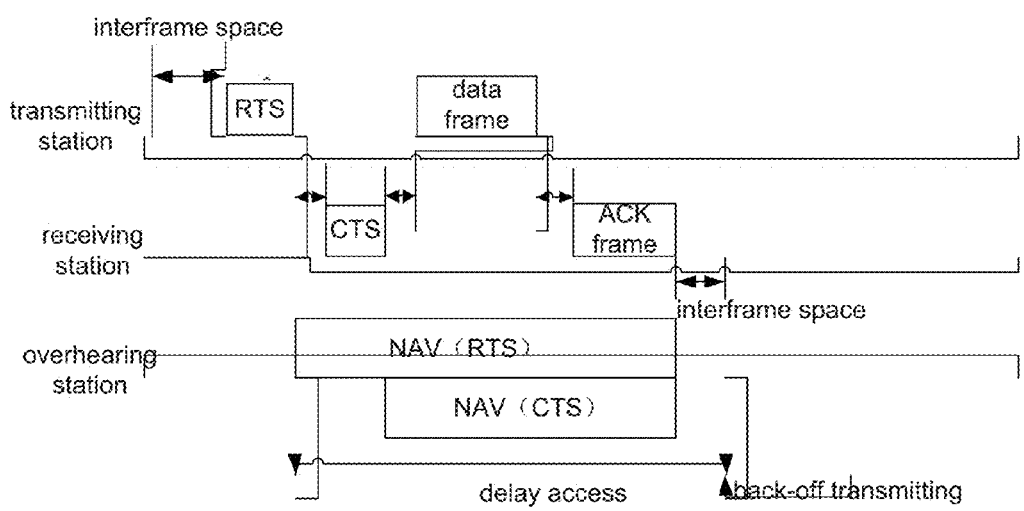
FIG. 2 is a schematic diagram of delay accessing a channel by an overhearing station according to settings of NAV.
Figure 3:
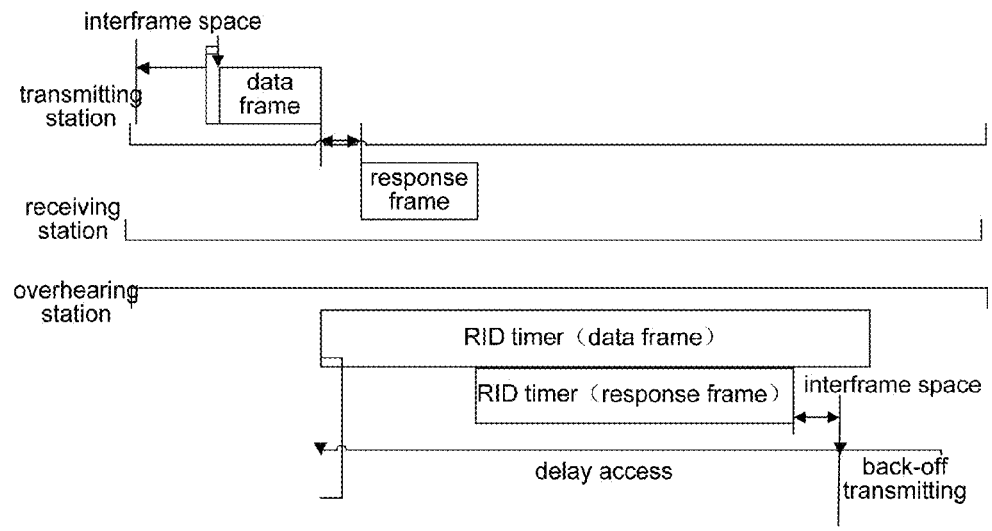
FIG. 3 is a schematic diagram of delay accessing a channel by an overhearing station according to settings of RID Timer.
Figure 4:
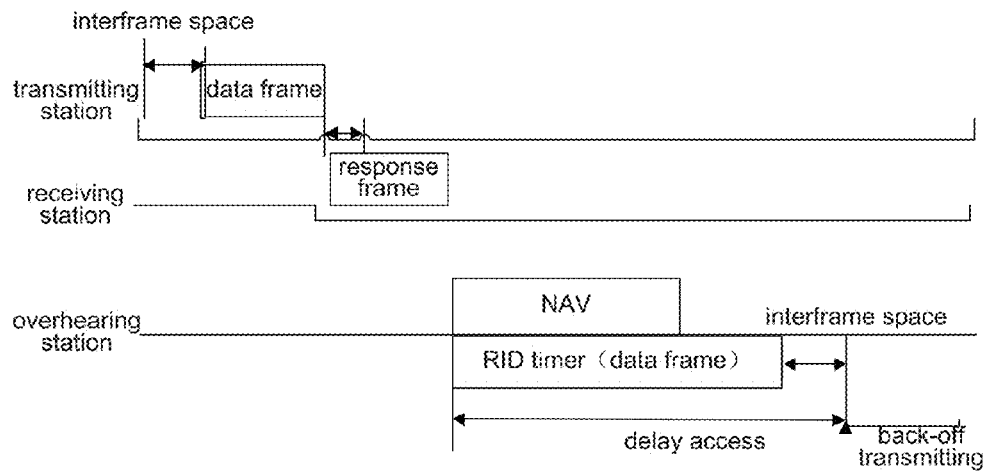
FIG. 4 is a schematic diagram of delay accessing a channel by an overhearing station according to settings of NAV and RID Timer.

The technical solution of the disclosure is described in further detail below by specific embodiments in conjunction with the accompanying drawings.

An embodiment of the disclosure provides a method for processing channel access. The method mainly includes that: a wireless station determines a first delay access variable and/or a second delay access variable according to the received radio frame; the wireless station determines delay time for accessing a channel according to the second delay access variable or according to the first delay access variable and the second delay access variable.

In an embodiment, when the wireless station acquires first subscription indication information from the received radio frames, the wireless station may determine the first delay access variable according to the first subscription indication information.

In an embodiment, when the wireless station acquires second subscription indication information from the received radio frames, the wireless station may determine the second delay access variable according to the second subscription indication information.

In an embodiment, when the wireless station acquires the first subscription indication information and the second subscription indication information from the received radio frames, and a target station of the radio frames is not the wireless station, the wireless station may compare the second subscription indication information with the second delay access variable currently stored in the wireless station, select the greater value of them to update the second delay access variable, and the wireless station may ignore the value of the first delay access variable or setting the first delay access variable to zero or setting the first delay access variable to the same value as the updated second delay access variable; the wireless station may determine the delay time for accessing the channel according to the updated second delay access variable.

In an embodiment, when the wireless station acquires only the first subscription indication information from the received radio frames, and a target station of the radio frames is not the wireless station, the wireless station may set the first delay access variable according to the first subscription indication information, keep the value of the second delay access variable stored in the wireless station constant; the wireless station may determine the delay time for accessing the channel according to the greater value of the first delay access variable and the second delay access variable.

In an embodiment, when the wireless station receives radio frames that are targeted to the wireless station, the wireless station may set the first delay access variable stored in the wireless station itself to zero, and keep the second delay access variable constant.

In the embodiments of the disclosure, the first subscription indication information is used to indicate the type of the next radio frame to be transmitted by a sender or receiver. This type may be one of:
1) no response;
2) normal response;
3) block response;
4) response that is not a normal response, block response, CTS.

In the embodiments of the disclosure, the first subscription indication information may be a response indication field included in a signaling field in a radio frame. The first delay access variable indicates time that an overhearing station needs to wait for accessing a channel. The first delay access variable may be a response indication delay timer.

In the embodiments of the disclosure, the second subscription indication information may be used to indicate time predicted by the sender during which the channel is busy since the end of the last physical protocol data unit carrying this information. The second subscription indication information may be duration information included in the radio frame;

the second delay access variable indicates time that an overhearing station needs to wait for accessing a channel, wherein the second delay access variable may be a network allocation vector.

Figure 5:
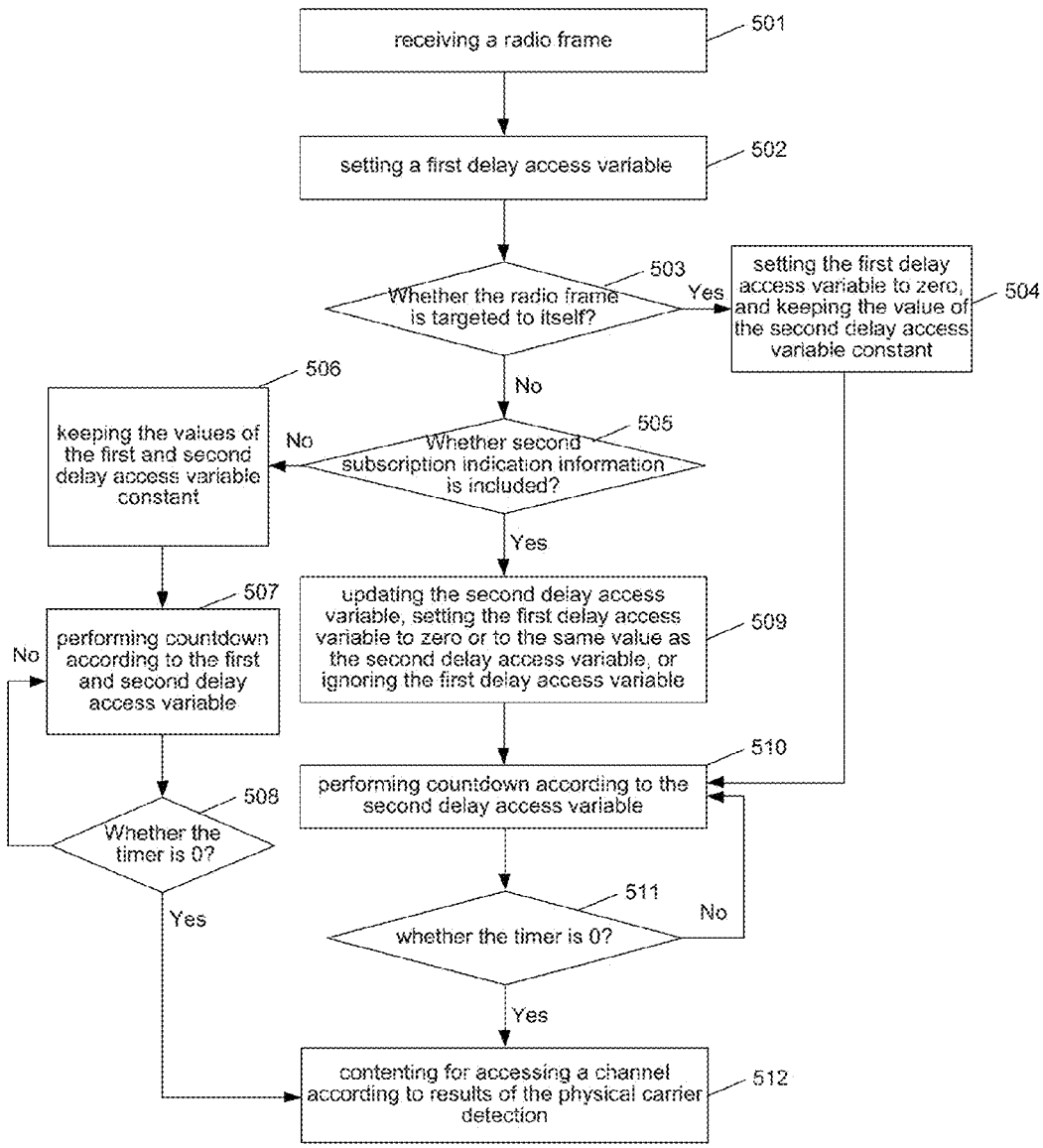
FIG. 5 is a flow chart of a method for processing channel access in accordance with an embodiment of the disclosure.

A method for processing channel access of the disclosure will be described in further detail below in conjunction with FIG. 5. As shown in FIG. 5, the method mainly includes the following steps:

step 501: a wireless station receives a radio frame.

step 502: a first delay access variable is set according to first subscription indication information in the radio frame.

step 503: the wireless station determines whether the radio frame is targeted to itself, i.e., determines whether the target station of the radio frame is the wireless station itself; if so, step 504 is performed; otherwise, step 505 is performed.

step 504: the wireless station sets the first delay access variable stored in itself to zero, and keeps the value of the second delay access variable constant. Then, the method proceeds to step 510.

step 505: it determines whether second subscription indication information is included in the radio frame; if so, step 509 is performed; otherwise, step 506 is performed.

step 506: the values of the first delay access variable and the second delay access variable are kept constant.

step 507: countdown is performed according to the greater one of the first delay access variable and the second delay access variable.

step 508: it determines whether the timer is 0; if so, step 512 is performed; otherwise, the process returns to step 507.

step 509: the second subscription indication information is compared with the second delay access variable currently stored in the wireless station, and the greater value of them is selected to update the second delay access variable; the first delay access variable is set to zero or set to the same value as the second delay access variable, or the value of the first delay access variable is ignored.

step 510: countdown is performed according to the second delay access variable.

step 511: it determines whether the timer is 0; if so, step 512 is performed; otherwise, the process returns to step 510.

step 512: it contents for accessing a channel according to results of the physical carrier detection.

Figure 6:
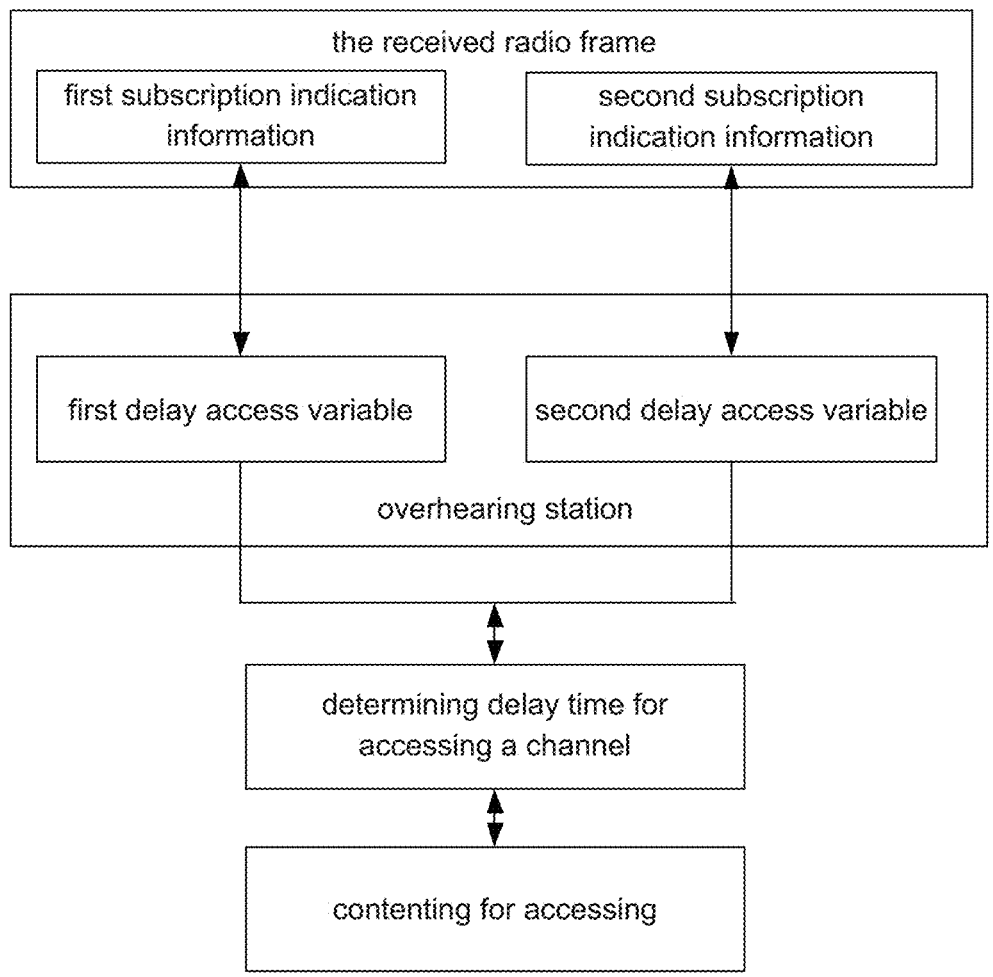
FIG. 6 is a schematic diagram of processing of channel access in accordance with an embodiment of the disclosure.

The method for processing channel access of the disclosure will be described in further detail below by specific embodiments in conjunction with the schematic diagram of processing of channel access shown in FIG. 6.

Embodiment 1

In a wireless communication system using two virtual channel detection mechanisms in which NAV (i.e., a second delay access variable) and RID timer (i.e., a first delay access variable) are set, there are three stations: STA-a, STA-b and STA-c.

The STA-a transmits a radio frame to the STA-b. An ACK indication field in a physical frame header of the radio frame indicates non-ACK, BlockACK or CTS. The STA-b receives the radio frame correctly, and determines that a destination address of the radio frame is MAC address of the STA-b. Then, the STA-b sets its RID timer to 0, and keeps its NAV constant.

Figure 7:
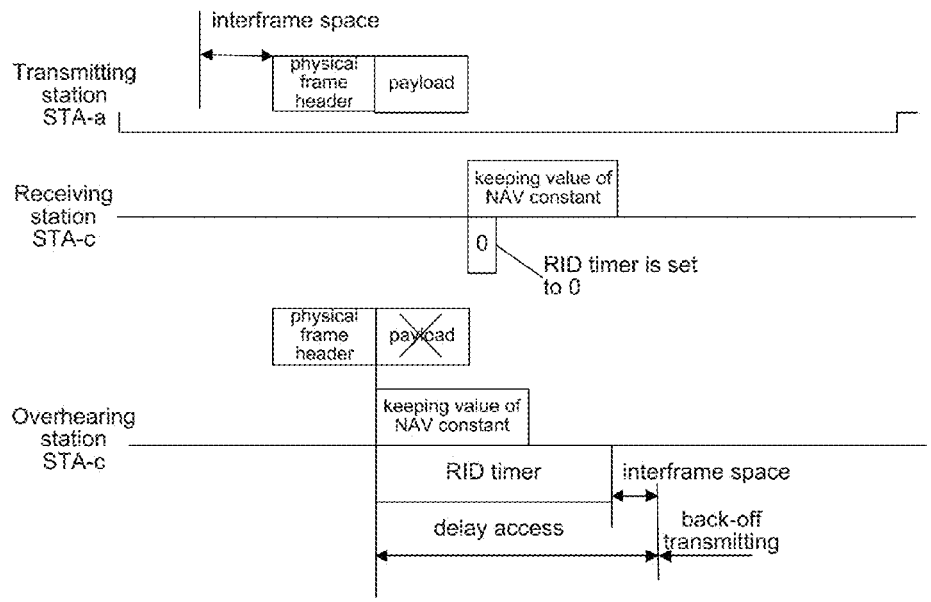
FIG. 7 is a schematic diagram 1 of delay accessing a channel in accordance with an embodiment of the disclosure.

The STA-c is an overhearing station. In the STA-c, an initial value of NAV is V1, and an initial value of RID timer is T1. The STA-c receives and decodes the radio frame, and determines that the partial association identifier (partial AID) in the radio frame does not match the partial AID of the STA-c. In order to saving energy, the STA-c discards this radio frame. Since a duration field (i.e., the second delay access variable) is not found in the MAC frame header, the STA-c does not update its NAV (i.e., keeps the value V1 of NAV constant), and update the RID timer with time required for transmitting MAX_PPDU+ACK+2*SIFS, wherein MAX_PPDU is the greatest physical protocol data unit (PPDU), SIFS is a short interframe space. When the values of NAV and RID timer are count to 0, the STA-c competes for accessing a channel according to results of physical carrier detection, as shown in FIG. 7.

Embodiment 2

In a wireless communication system using two virtual channel detection mechanisms in which NAV and RID timer are set, there are three stations: STA-a, STA-b and STA-c.

The STA-a transmits a radio frame to the STA-b. An ACK indication field in a physical frame header of the radio frame indicates non-ACK, BlockACK or CTS. The STA-b receives the radio frame correctly, and determines that a destination address of the radio frame is MAC address of the STA-b. Then, the STA-b sets its RID timer to 0, and keeps its NAV constant.

The STA-c is an overhearing station. In the STA-c, an initial value of NAV is V1, and an initial value of RID timer is T1. The STA-c receives the radio frame incorrectly, and does not acquire a correct value of duration. Then, the STA-c does not update its NAV (i.e., keeps the value V1 of NAV constant), and update the RID timer with time required for transmitting MAX_PPDU+ACK+2*SIFS according to a value of the ACK indication field. When the values of NAV and RID timer are count to 0, the STA-c competes for accessing a channel according to results of physical carrier detection, as shown in FIG. 7.

Embodiment 3

In a wireless communication system using two virtual channel detection mechanisms in which NAV and RID timer are set, there are three stations: STA-a, STA-b and STA-c.

The STA-a transmits a radio frame to the STA-b. An ACK indication field in a physical frame header of the radio frame indicates non-ACK, BlockACK or CTS. The STA-b receives the radio frame correctly, and determines that a destination address of the radio frame is MAC address of the STA-b. Then, the STA-b sets its RID timer to 0, and keeps its NAV constant.

Figure 8:
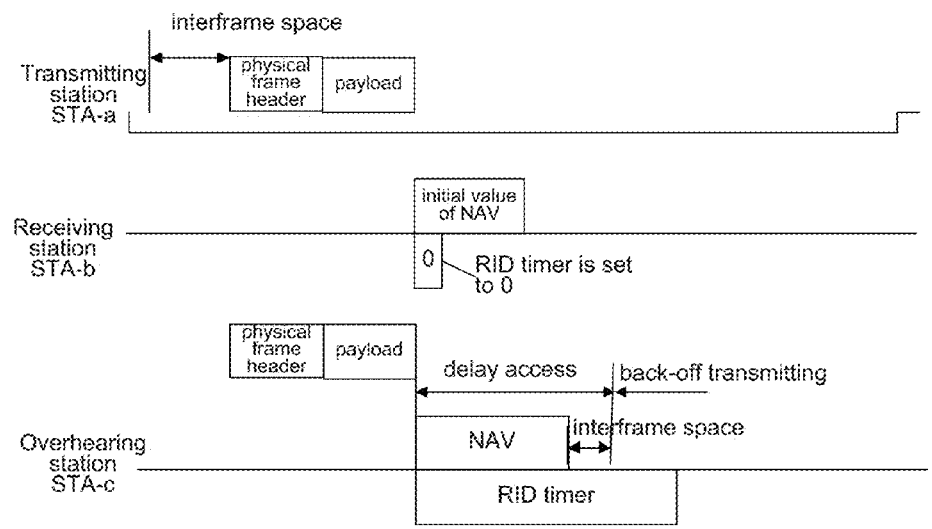
FIG. 8 is a schematic diagram 2 of delay accessing a channel in accordance with an embodiment of the disclosure.

The STA-c is an overhearing station. In the STA-c, an initial value of NAV is V1, and an initial value of RID timer is T1. The STA-c receives and decodes the radio frame correctly, and acquires a value V2 of duration. The STA-c compares V2 with V1, and calculates V3=MAX (V1, V2), i.e., V3 equals to the greater one of V1 and V2. Then, the STA-c updates the value of NAV with V3. In addition, the STA-c may also set the value of its RID timer to time required for transmitting MAX_PPDU+ACK+2*SIFS according to a value of ACK indication field (i.e., a first subscription indication information). In this situation, the STA-c may ignore the value of the RID timer, set the value of the RID timer to 0, or set the value of the RID timer to the same value as that of NAV. Also, when the value of NAV is count to 0, the STA-c competes for accessing a channel according to results of physical carrier detection, as shown in FIG. 8.

Embodiment 4

In a wireless communication system using two virtual channel detection mechanisms in which NAV and RID timer are set, there are three stations: STA-a, STA-b and STA-c.

The STA-a transmits a radio frame to the STA-b. This radio frame is a no-load physical frame type (NDP) of radio frame. An ACK indication field in a physical frame header of the radio frame indicates non-ACK, BlockACK or CTS, and channel subscription time information (duration) is included in a signaling field. The STA-b receives the radio frame correctly, and determines that a destination address of the radio frame is MAC address of the STA-b. Then, the STA-b sets its RID timer to 0, and keeps its NAV constant.

Figure 9:
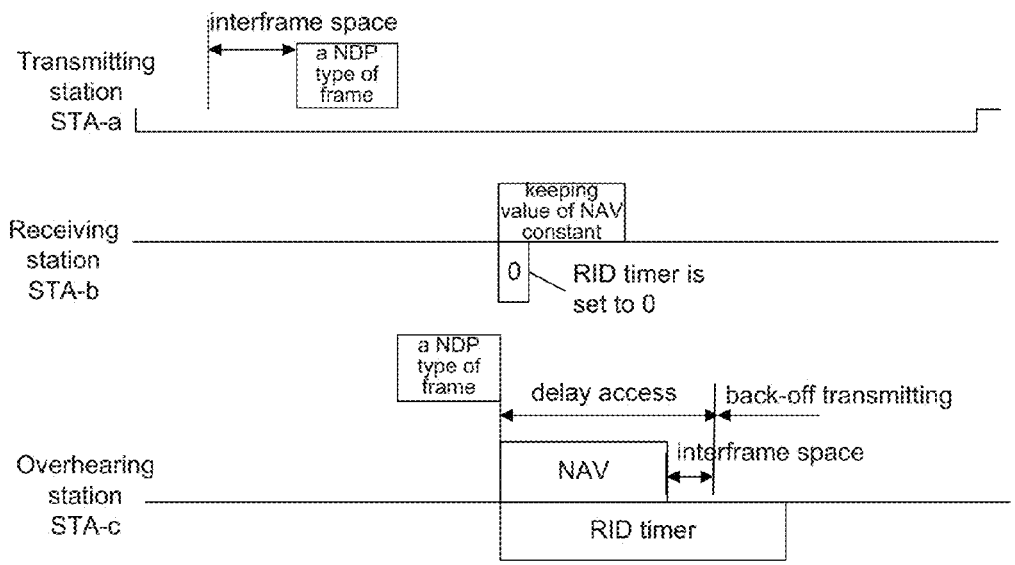
FIG. 9 is a schematic diagram 3 of delay accessing a channel in accordance with an embodiment of the disclosure.

The STA-c is an overhearing station. In the STA-c, an initial value of NAV is V1, and an initial value of RID timer is T1. The STA-c receives the radio frame, and acquires duration information V2 in the signaling field of the NDP radio frame. The STA-c compares V1 with V2, calculates V3=MAX (V1, V2), and updates the value of NAV with V3. The STA-c may also set the value of RID timer to time required for transmitting MAX_PPDU+ACK+2*SIFS according to value of ACK indication field. In this situation, the STA-c may ignore the value of the RID timer, set the value of the RID timer to 0, or set the value of the RID timer to the same value as that of NAV. Also, when the value of NAV is count to 0, the STA-c competes for accessing a channel according to results of physical carrier detection, as shown in FIG. 9.

Embodiment 5

In a wireless communication system using two virtual channel detection mechanisms in which NAV and RID timer are set, there are three stations: STA-a, STA-b and STA-c.

The STA-a transmits a radio frame to the STA-b. This radio frame is a radio frame with a short MAC frame header. An ACK indication field in a physical frame header of the radio frame indicates non-ACK, BlockACK or CTS, and the short MAC frame header does not include a duration field. The STA-b receives the radio frame correctly, and determines that a destination address of the radio frame is MAC address of the STA-b. Then, the STA-b sets its RID timer to 0, and keeps its NAV constant.

Figure 10:
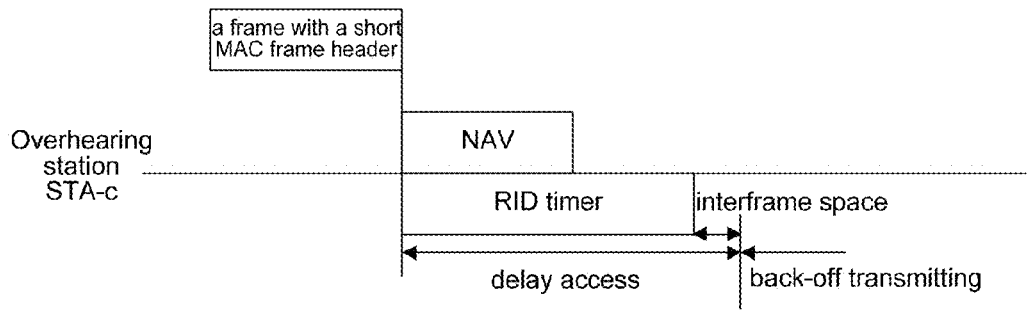
FIG. 10 is a schematic diagram 4 of delay accessing a channel in accordance with an embodiment of the disclosure.

The STA-c is an overhearing station. In the STA-c, an initial value of NAV is V1, and an initial value of RID timer is T1. The STA-c receives the radio frame, and keeps the value of NAV constant. The STA-c may set the value of RID timer to time required for transmitting MAX_PPDU+ACK+2*SIFS according to a value of the ACK indication field. In this situation, when the NAV and RID timer are count to 0, the STA-c competes for accessing a channel according to results of physical carrier detection, as shown in FIG. 10.

Embodiment 6

In a wireless communication system using two virtual channel detection mechanisms in which NAV and RID timer are set, there are three stations: STA-a, STA-b and STA-c.

The STA-a transmits a radio frame to the STA-b. An ACK indication field in a physical frame header of the radio frame indicates non-ACK, BlockACK or CTS. The STA-b receives the radio frame correctly, and determines that a destination address of the radio frame is MAC address of the STA-b. Then, the STA-b sets its RID timer to 0, and keeps its NAV constant.

The STA-c is an overhearing station in which a local timer T is maintained. When the local timer is count to 0, the STA-c competes for accessing a channel according to results of physical carrier detection. The STA-c receives the radio frame, and acquires a correct value of duration. The STA-c compares the value of the duration with the NAV, updates a value of NAV with the greater value of them, and updates a value of RID timer to time required for transmitting MAX_PPDU+ACK+2*SIFS according to a value of the ACK indication field. In this situation, the STA-c set the above timer T with the value of NAV. When the timer T is count to 0, the STA-c competes for accessing a channel according to results of physical carrier detection.

Figure 11:
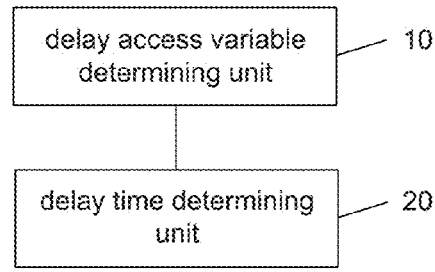
FIG. 11 is a schematic structure diagram of a device for processing channel access in accordance with an embodiment of the disclosure.

Corresponding to the above method for processing channel access, an embodiment of the disclosure also provides a device for processing channel access. As shown in FIG. 11, the device includes:

a delay access variable determining unit 10, which is configured to determine a first delay access variable and/or a second delay access variable according to radio frames received by a wireless station;

a delay time determining unit 20, which is configured to determine delay time for accessing a channel according to the second delay access variable or according to the first delay access variable and the second delay access variable.

In an embodiment, the delay access variable determining unit 10 may be further configured, when the wireless station acquires first subscription indication information from the received radio frames, to determine the first delay access variable according to the first subscription indication information.

In an embodiment, the delay access variable determining unit 10 may be further configured, when the wireless station acquires second subscription indication information from the received radio frames, to determine the second delay access variable according to the second subscription indication information.

In an embodiment, the delay access variable determining unit 10 may be further configured, when the wireless station acquires the first subscription indication information and the second subscription indication information from the received radio frames, and a target station of the radio frames is not the wireless station, to compare the second subscription indication information with the second delay access variable currently stored in the wireless station, select a greater value of them to update the second delay access variable, and ignore a value of the first delay access variable or set the first delay access variable to zero or set the first delay access variable to the same value as the updated second delay access variable;

correspondingly, the delay time determining unit 20 may be further configured to determine the delay time for accessing the channel according to the updated second delay access variable.

In an embodiment, the delay access variable determining unit 10 may be further configured, when the wireless station acquires only the first subscription indication information from the received radio frames, and a target station of the radio frames is not the wireless station, to set the first delay access variable according to the first subscription indication information, keep the value of the second delay access variable stored in the wireless station constant;

correspondingly, the delay time determining unit 20 may be further configured to determine the delay time for accessing the channel according to the greater value of the first delay access variable and the second delay access variable.

In an embodiment, the delay access variable determining unit 10 may be further configured, when the wireless station receives radio frames that are targeted to the wireless station, to set the first delay access variable stored in itself to zero, and keep the second delay access variable constant.

In an embodiment, the first subscription indication information is a response indication field included in a signaling field in the radio frame;

the first delay access variable is a response indication delay timer; the second subscription indication information is duration information included in the radio frame; and the second delay access variable is a network allocation vector.

The above device for processing channel access may be located within a wireless station. In addition, the above the delay access variable determining unit 10 and the delay time determining unit 20 may be implemented by a Central Processing Unit (CPU), a Micro Processing Unit (MPU), a Digital Signal Processor (DSP), or a Field Programmable Gate Array (FPGA) in the device for processing channel access.

Those skilled in the art should understand that the embodiments of the disclosure may be provided as a method, system, or computer program product. Therefore, the disclosure may be implemented in a form of hardware embodiment, software embodiment, or a combination thereof. Also, the disclosure may be employed in a form of a computer program product implemented on one or more computer available storage medium (including, but not limited to, disk storage and optical storage) having computer available program code stored thereon.

The disclosure is described with reference to flow charts and/or block diagrams according to method, device (system) and computer program product of embodiments of the disclosure. It should be appreciated that each flow and/or block in the flow charts and/or block diagrams and a combination thereof may be implemented by computer program instructions. These computer program instructions may be provide to a general-purpose computer, a dedicated computer, an embedded processor, or a processor of other programmable data processing device to produce a machine such that the instructions can be processed by processors of a computer or other programmable data processing device to produce a device for implementing the functions designated in one or more flows of the flow charts and/or one or more blocks of the block diagrams.

These computer program instructions also may be stored in a computer readable storage that can make a computer or other programmable data processing device to operate in a particular manner such that an article of manufacture including an instruction device may be produced by the instructions stored in the computer readable storage. This instruction device may implement the functions designated in one or more flows of the flow charts and/or one or more blocks of the block diagrams.

These computer program instructions also may be loaded on a computer or other programmable data processing device such that a series of operational steps can be executed on the computer or other programmable data processing device to produce a process implemented by the computer. Thus, the instructions executed on the computer or other programmable data processing device can provide steps for implementing the functions designated in one or more flows of the flow charts and/or one or more blocks of the block diagrams.

An embodiment of the disclosure further provides a computer-readable storage medium including a set of instructions for executing the method for processing channel access provided in the embodiments of the disclosure.

The above are only the preferred embodiments of the disclosure, and are not intended to limit the protection scope of the disclosure.

The invention claimed is:

1. A method for processing channel access, comprising:
determining, by a wireless station, a first delay access variable or the first delay access variable and a second delay access variable according to received radio frames;
determining, by the wireless station, delay time for accessing a channel according to the second delay access variable or according to the first delay access variable and the second delay access variable;
wherein the step of determining delay time for accessing a channel by the wireless station according to the second delay access variable or according to the first delay access variable and the second delay access variable comprises:
when the wireless station acquires first subscription indication information and second subscription indication information from the received radio frames, and when a target station of the radio frames is not the wireless station, comparing, by the wireless station, the second subscription indication information with the second delay access variable currently stored in the wireless station, selecting a greater value among them to update the second delay access variable, and ignoring a value of the first delay access variable or setting the first delay access variable to zero or setting the first delay access variable to a same value as the updated second delay access variable; determining, by the wireless station, the delay time for accessing the channel according to the updated second delay access variable;
when the wireless station acquires only first subscription indication information from the received radio frames, and when a target station of the radio frames is not the wireless station, setting, by the wireless station, the first delay access variable according to the first subscription indication information, keeping a value of the second delay access variable stored in the wireless station constant; determining, by the wireless station, the delay time for accessing the channel according to a greater value among the first delay access variable and the second delay access variable;
wherein the wireless station is configured to contend for accessing the channel based on the delay time.

2. The method according to claim 1, further comprising:
acquiring, by the wireless station, first subscription indication information from the received radio frames, and determining the first delay access variable according to the first subscription indication information.

3. The method according to claim 1, further comprising:
acquiring, by the wireless station, second subscription indication information from the received radio frames, and determining the second delay access variable according to the second subscription indication information.

4. The method according to claim 1, further comprising:
when the wireless station receives radio frames that are targeted to the wireless station, setting, by the wireless station, the first delay access variable stored in the wireless station itself to zero, and keeping the second delay access variable constant.

5. A device for processing channel access, comprising:
a processor; and
a memory for storing instructions executable by the processor;
wherein the processor is configured to:
determine a first delay access variable or the first delay access variable and a second delay access variable according to radio frames received by a wireless station;
determine delay time for accessing a channel according to the second delay access variable or according to the first delay access variable and the second delay access variable;
the processor is further configured, when the wireless station acquires first subscription indication information and second subscription indication information from the received radio frames, and when a target station of the radio frames is not the wireless station, to compare the second subscription indication information with the second delay access variable currently stored in the wireless station, to select a greater value among them to update the second delay access variable, and to ignore a value of the first delay access variable or set the first delay access variable to zero or set the first delay access variable to a same value as the updated second delay access variable; to determine the delay time for accessing the channel according to the updated second delay access variable;
the processor is further configured, when the wireless station acquires only first subscription indication information from the received radio frames, and when a target station of the radio frames is not the wireless station, to set the first delay access variable according to the first subscription indication information, and to keep a value of the second delay access variable stored in the wireless station constant; to determine the delay time for accessing the channel according to a greater value among the first delay access variable and the second delay access variable;
wherein the processor is configured to contend for accessing the channel based on the delay time.

6. The device according to claim 5, wherein the processor is further configured, when the wireless station acquires first subscription indication information from the received radio frames, to determine the first delay access variable according to the first subscription indication information.

7. The device according to claim 5, wherein the processor is further configured, when the wireless station acquires second subscription indication information from the received radio frames, to determine the second delay access variable according to the second subscription indication information.

8. The device according to claim 5, wherein
the processor is further configured, when the wireless station receives radio frames that are targeted to the wireless station, to set the first delay access variable stored in itself to zero, and to keep the second delay access variable constant.

9. A non-transitory computer-readable storage medium, comprising a set of instructions for determining a first delay access variable or the first delay access variable and a second delay access variable according to received radio frames;
determining delay time for accessing a channel according to the second delay access variable or according to the first delay access variable and the second delay access variable;

further comprising a set of instructions for:
when acquiring first subscription indication information and second subscription indication information from the received radio frames, comparing the second subscription indication information with the stored second delay access variable currently, selecting a greater value among them to update the second delay access variable, and ignoring a value of the first delay access variable or setting the first delay access variable to zero or setting the first delay access variable to a same value as the updated second delay access variable; determining the delay time for accessing the channel according to the updated second delay access variable;
when acquiring only first subscription indication information from the received radio frames, setting the first delay access variable according to the first subscription indication information, keeping a value of the stored second delay access variable constant; determining the delay time for accessing the channel according to a greater value among the first delay access variable and the second delay access variable;

wherein the non-transitory computer-readable storage medium is configured to contend or accessing the channel based on the delay time.

10. The non-transitory computer-readable storage medium according to claim 9, further comprising a set of instructions for acquiring first subscription indication information from the received radio frames, and determining the first delay access variable according to the first subscription indication information.

11. The non-transitory computer-readable storage medium according to claim 9, further comprising a set of instructions for acquiring second subscription indication information from the received radio frames, and determining the second delay access variable according to the second subscription indication information.

12. The non-transitory computer-readable storage medium according to claim 9, further comprising a set of instructions for setting the stored first delay access variable to zero, and keeping the second delay access variable constant.

* * * * *